US007661098B2

(12) United States Patent
Sheikh et al.

(10) Patent No.: US 7,661,098 B2
(45) Date of Patent: Feb. 9, 2010

(54) COMPUTER PROGRAM OPTIMIZATION IN A DYNAMIC COMPILATION ENVIRONMENT

(75) Inventors: Ali Ijaz Sheikh, Toronto (CA); Vijay Sundaresan, North York (CA)

(73) Assignee: International Business Machines Corporation, Armonk, NY (US)

(*) Notice: Subject to any disclaimer, the term of this patent is extended or adjusted under 35 U.S.C. 154(b) by 983 days.

(21) Appl. No.: 10/845,548

(22) Filed: May 13, 2004

(65) Prior Publication Data

US 2005/0071831 A1    Mar. 31, 2005

(30) Foreign Application Priority Data

Sep. 26, 2003   (CA)   .................................... 2443049

(51) Int. Cl.
*G06F 9/45* (2006.01)

(52) U.S. Cl. ...................... 717/151; 717/148; 717/158

(58) Field of Classification Search ........................ None
See application file for complete search history.

(56) References Cited

U.S. PATENT DOCUMENTS

| | | | | |
|---|---|---|---|---|
| 5,802,272 | A * | 9/1998 | Sites et al. | 714/45 |
| 5,909,580 | A | 6/1999 | Crelier et al. | 717/141 |
| 6,704,927 | B1 * | 3/2004 | Bak et al. | 717/151 |
| 2002/0178437 | A1 * | 11/2002 | Blais et al. | 717/140 |
| 2004/0210882 | A1 * | 10/2004 | Takeuchi | 717/141 |

FOREIGN PATENT DOCUMENTS

| | | |
|---|---|---|
| WO | WO91/20030 | 6/1991 |
| WO | WO02/29725 A1 | 9/2001 |

OTHER PUBLICATIONS

V.C. Sreedhar, M. Burke, and J.-D. Choi. A Framework for Interprocedural Optimization in the Presence of Dynamic Class Loading. ACM SIGPLAN Notices, 35(5):196-207, 2000.*
Sundaresan et al, Pratical Virtual Method Call Resolution in Java, Proceedings of the 15th ACM SIGPLAN Conference on Object Oriented Programming Systems, Languages and Applications (OOPSLA), 2000, pp. 264-280, retrieved on [Sep. 17, 2009].*
Aigner et al. Eliminating Virtual Function Calls in C++ Programs, Lecture Notes in Computer Science, 1996, vol. 1098/1996, pp. 142-166. Retrieved on [Sep. 17, 2009] Retrieved from the Internet: URL<http://www.springerlink.com/content/u48447t67g6702q2/fulltext.pdf.*

* cited by examiner

*Primary Examiner*—Tuan Q Dam
*Assistant Examiner*—Cheneca P Smith
(74) *Attorney, Agent, or Firm*—DeLizio Gilliam, PLLC

(57) ABSTRACT

Dynamically compiled computer program code containing virtual calls can reduce the options for optimization during compilation. A virtual call can affect sections of the program code that are compiled subsequent to the virtual call. Therefore, the state under which the effected sections are to be executed may not be known at the time of compilation thus complicating optimization of these sections. If assumptions are made about the state of an effected section, then this section can be optimized. In order to provide proper operation of the executing program code given the optimization, a check of the validity of the assumptions is performed prior to execution of the optimized section. If an assumption does not hold true then the original un-optimized section can be executed to reduce adverse program performance.

18 Claims, 4 Drawing Sheets

COMPUTER PROGRAM OPTIMIZATION IN A DYNAMIC COMPILATION ENVIRONMENT

FIELD OF THE INVENTION

The present invention relates to the field of optimizing computer program code during dynamic compiling thereof.

BACKGROUND OF THE INVENTION

Object-oriented programming languages organize ideas by classes, which are data structures composed of both variables and methods. Certain object-oriented programming languages, such as Java, may enable one class to be built upon or extended by another class (subclass) which inherits the features of the class that is being built upon. In addition to acquiring features, the subclass can override methods defined in the acquired features; thus, there can be multiple classes that define a method with the same name but with different functionality. In such a case, the method carried out depends on the class of the of the object (i.e. class representation) that receives the call for execution of the method. As a result, such a method call is not static as it may not be known during compiling of the computer program code which class will actually call the method; thus such a method call is considered to be a virtual call.

Computer program code is compiled for implementation, which involves reading the program code, analyzing the semantic form for errors, optimizing the code to reduce cost during execution and translating the code into a language suitable for execution. During compiling, the definition of classes are incorporated into the compiled code as they are encountered. During the optimizing stage, code is simplified to reduce execution time using known techniques such as trying to present the code in static form by converting virtual calls to direct method calls. Such known techniques generally attempt to perform whole program analysis where all relationships between classes (represented by a class hierarchy) and all relationships between methods (represented by call graphs) are known.

The computer program code may be compiled such that new classes may be dynamically incorporated during execution and the methods from the newly incorporated classes may be carried out. In this case, the class hierarchy and call graphs can change between compiling and execution. The effect of this may be, for example, that variables are altered during execution of the program code by a class that was not incorporated when a particular method was compiled. Further, classes are only known after they have been incorporated. Thus, known techniques based on an assumption of a static class hierarchy and static call graphs are not valid for computer program code that is dynamically compiled.

SUMMARY OF THE INVENTION

In accordance with an aspect of the present invention there is provided in a dynamic compiling environment, a method of optimizing computer program code having a virtual call that produces unpredictable effects, said method comprising: identifying a section of the computer program code whose associated state is unpredictable as a result of the virtual call; optimizing the section based on a set of assumptions about the associated state; and creating a test in the section for validity of the set of assumptions to activate the optimized section if the set of assumptions is valid.

In accordance with another aspect of the present invention there is provided in an execution environment having a dynamic compiler and an operating environment for execution of computer program code, a method of optimizing the computer program code having a virtual call that produces unpredictable effects, said method comprising: identifying a section of the computer program code whose associated state is unpredictable as a result of the virtual call; optimizing the section based on a set of assumptions about the associated state; creating a test in the section for validity of the set of assumptions to activate the optimized section if the set of assumptions is valid; and monitoring the associated state of the section during execution of the computer program code to maintain a watch on the validity of the set of assumptions.

In accordance with yet another aspect of the present invention there is provided a system for optimizing a computer program code having a virtual call that produces unpredictable effects in an execution environment having a dynamic compiler and an operating environment, said system comprising: a plurality of optimization mechanisms each performing a different type of optimization, each mechanism comprising: an identification mechanism for identifying a section of the computer program code according to the type optimization performed by the optimization mechanism, the section having an associated state that is unpredictable as a result of the virtual call; a section optimization mechanism for optimizing the section based on a set of assumptions about the associated state; a test mechanism for creating a test in the section for validity of the set of assumptions to activate the optimized section if the set of assumptions are valid; a data storage containing an indication of the associated state for the section and the result of the associated state on the validity of the set of assumptions; and a monitoring mechanism for monitoring the associated state and updating the indication of the associated state in the data storage to maintain a check of the validity of the assumptions during execution of the computer program code.

In accordance with a further aspect of the present invention there is provided a computer readable medium having stored thereon computer-executable instructions for optimizing computer program code having a virtual call that produces unpredictable effects in a dynamic compiling environment, said computer-executable instructions comprising: identifying a section of the computer program code whose associated state is unpredictable as a result of the virtual call; optimizing the section based on a set of assumptions about the associated state; and creating a test in the section for validity of the set of assumptions to activate the optimized section if the set of assumptions is valid.

In accordance with an aspect of the present invention there is provided a computer readable medium having stored thereon computer-executable instructions for optimizing the computer program code having a virtual call that produces unpredictable effects in an execution environment having a dynamic compiler and an operating environment for execution of computer program code, said computer-executable instructions comprising: identifying a section of the computer program code whose associated state is unpredictable as a result of the virtual call; optimizing the section based on a set of assumptions about the associated state; creating a test in the section for validity of the set of assumptions to activate the optimized section if the set of assumptions is valid; and monitoring the associated state of the section during execution of the computer program code to maintain a check of the validity of the set of assumptions.

Dynamically compiled computer program code containing virtual calls can reduce the options for optimization during compilation. The virtual call can affect sections of the program code that are compiled subsequent to the virtual call. Therefore, the state under which the effected sections are to be executed may not be known at the time of compilation thus complicating optimization of these sections. If assumptions are made about the state of an effected section, then this section can be optimized. In order to provide proper operation of the executing program code given the optimization, a check of the validity of the assumptions is performed prior to execution of the optimized section. If the assumption does not hold true then the original un-optimized section can be executed to reduce adverse program performance.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION

Figure 1:
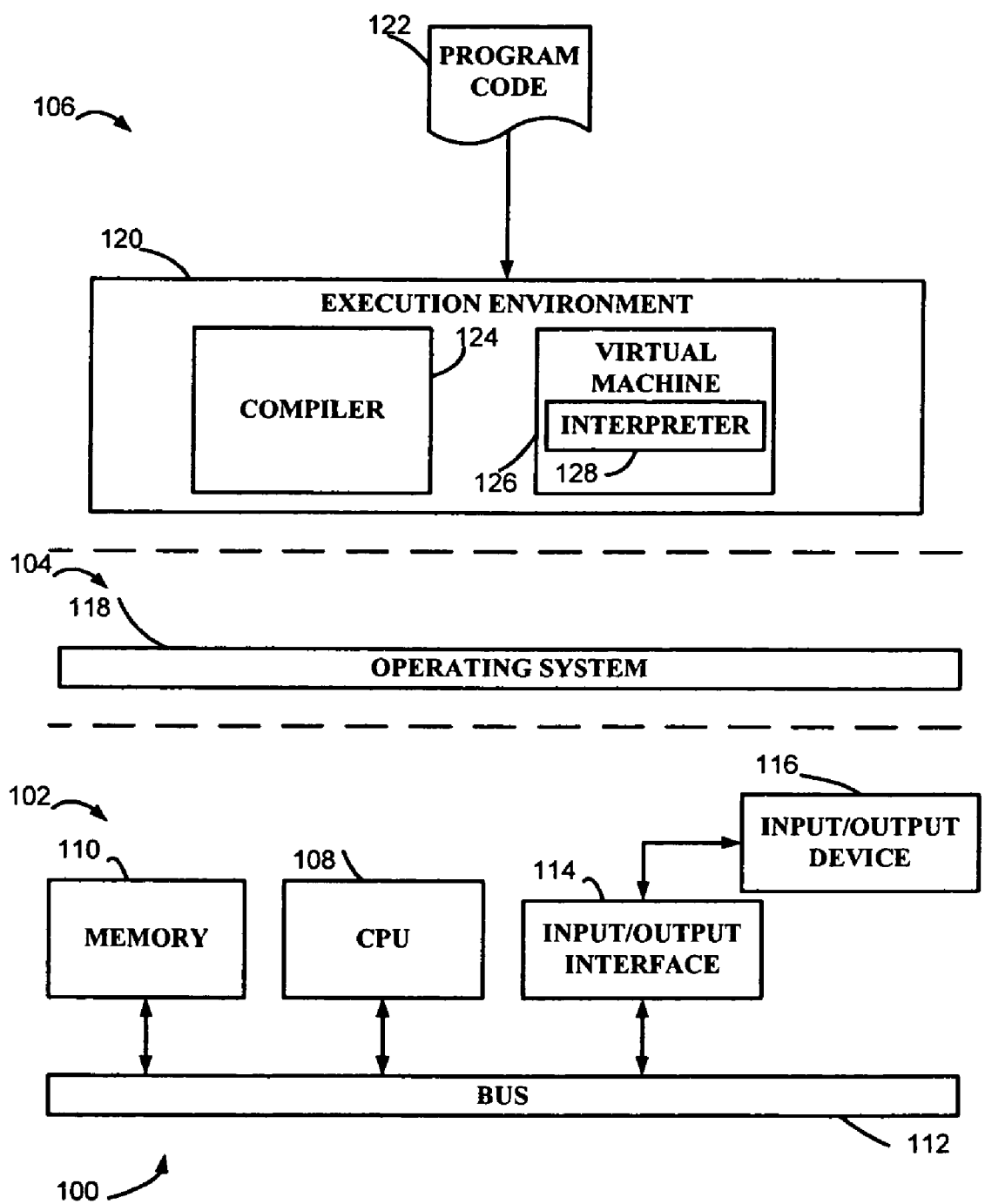
FIG. 1 is a system diagram of an exemplary computing environment suitable for implementation of the present invention.

FIG. 1 and the associated description represent an example of a suitable computing environment 100 in which the present invention may be implemented. The computer 100 has different layers of functionality that are built on top of each other to cooperatively operate. A hardware layer 102 includes the hardware resources in the computer 100. The operating system layer 104 runs in conjunction with the hardware layer 102 and interconnects the hardware layer 102 with a software layer 106. The software layer 106 contains the functionality with which a user interacts.

The hardware layer 102 contains the physical components of the computer 100 and includes a central processing unit (CPU) 108, a memory 110, an input/output interface 114 and a bus 112. The CPU 108, the memory 110 and the input/output interface 114 are connected with one another via the bus 112. The input/output interface 114 is configured so that it can be connected to an input/output unit 116.

The CPU 108 can be a commercially available CPU or a customized CPU suitable for operations described herein. Other variations of the CPU 108 can include a plurality of CPUs interconnected to coordinate various operations and functions. The computer 100 serves as an apparatus for performing the present method by the CPU 108 executing the present invention.

The operating system layer 104 includes an operating system 118 that interfaces with the physical components in the hardware layer 102. The operating system 118 may reside in the memory 110, be executed by the CPU 108 and take advantage of the bus 112 to interact with other components in the hardware layer 102.

The software layer 106 includes an execution environment 120 that transforms program code 122 supplied by a user into a form that can be executed by the computer 100. The execution environment 120 includes a compiler 120 that accepts the program code 122 and translates it into an intermediate form. A virtual machine 126 in the execution environment 120 includes an interpreter 128 that obtains the intermediate form of the program code 122 and interfaces with the operating system 118 to interpret the code for execution on the computer 100 through interactions with components in the hardware layer 102. The virtual machine 126 acts as a separate operating environment for execution of the computer program code 122 and keeps track of the state of the program code 122 during execution.

The present invention is incorporated in the compiler 124 which may be embodied in a program stored in, for example, the memory 110. Alternatively, the present invention may be recorded on any type of recording medium such as a magnetic disk or an optical disk. The present invention recorded on such a recording medium may be loaded to the memory 110 of the computer 100 via the input/output unit 116 (e.g. a disk drive).

Figure 2:
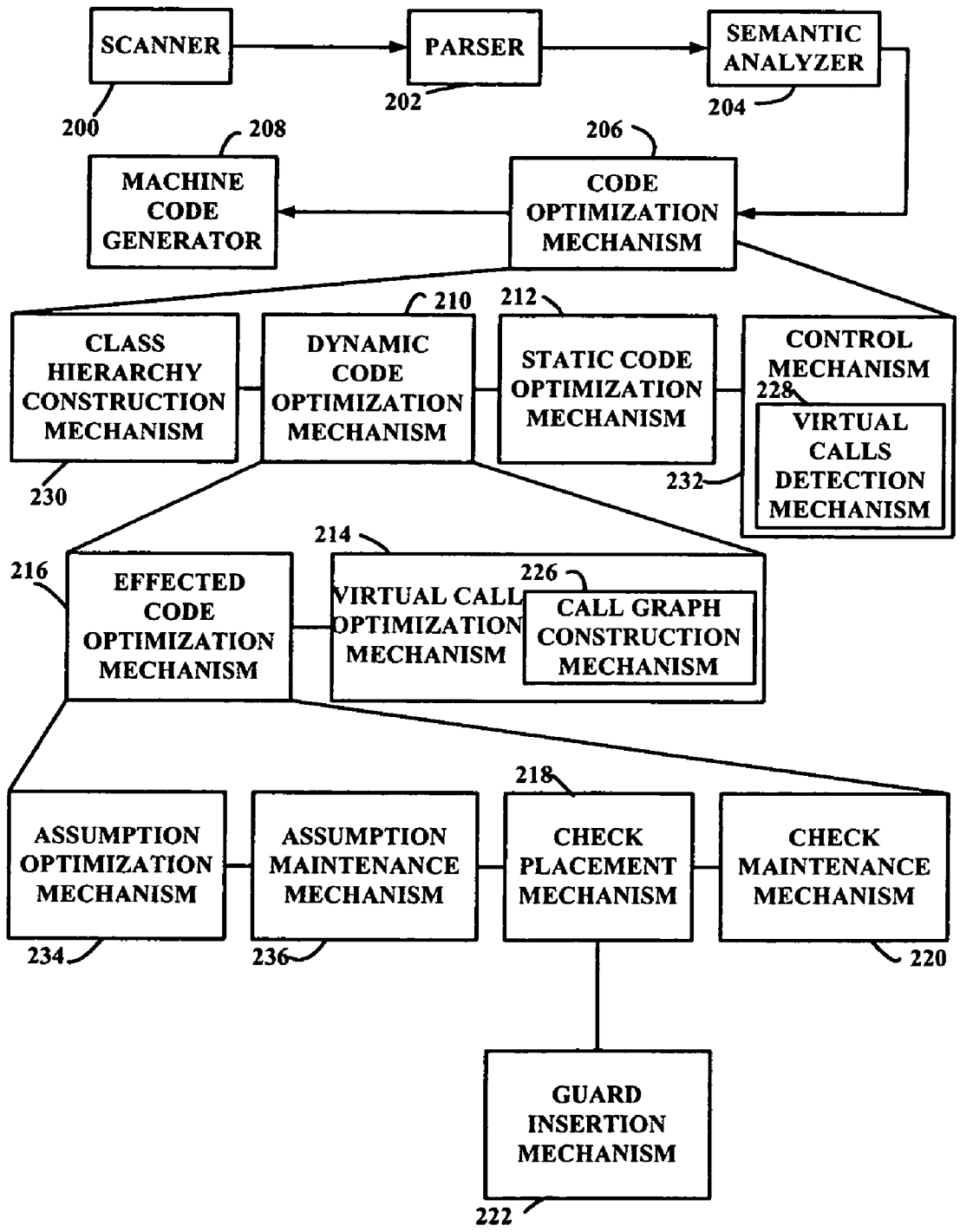
FIG. 2 is a system diagram of a compiler according to an embodiment of the present invention.

FIG. 2 illustrates a system diagram of the compiler 124 according to an embodiment of the present invention. The compiler 124 includes a scanner 200, a parser 202, a semantic analyzer 204, a code optimization mechanism 206 and a machine code generator 208. The scanner 200 scans the program code 122 to create a character string with the characters of the program code 122 according to techniques known in the art. The parser 202 then analyzes the character string to decipher complete words or commands (tokens) from the character string according to techniques known in the art. These tokens are then passed to a semantic analyzer 204 that assesses the validity of the syntax of the program code 122 given a set of rules that are specific to the format or language of the program code 122. After the syntax has been assessed, and deemed acceptable, the tokens are interpreted by the semantic analyzer 204 to determine their meaning (e.g. the functions to be performed, the variables, etc.). Interpretation of the tokens gives meaning to the program code 122 for the code optimization mechanism 206 and the machine code generator 208. The semantic analyzer 204 performs its analysis according to known techniques.

The program code 122 is provided to the code optimization mechanism 206 from the semantic analyzer 204 where the code can be optimized to enhance its execution characteristics, such as execution time, number of resources used, etc. After the code has been optimized it is provided to a machine code generator 208 where the code is translated according to known techniques into the intermediate form that can be interpreted for execution in the interpreter 128 in conjunction with the components of the hardware layer 102.

The code optimization mechanism 206 includes a dynamic code optimization mechanism 210, a static code optimization mechanism 212, a class hierarchy construction mechanism 230, and a control mechanism 232. The control mechanism 232 coordinates optimization of the program code 122 between the class hierarchy construction mechanism 230, the dynamic code optimization mechanism 210 and the static code optimization mechanism 212. The control mechanism 232 has the class hierarchy construction mechanism 230 search through the program code 122 at the beginning of the optimization process to identify all class definitions therein. A class hierarchy is created by the class hierarchy construction mechanism 230 based on the identified class definitions in the program code 122.

The static code optimization mechanism 212 performs optimizations using known techniques on those sections of the program code 122 that have a static class hierarchy and a static call graph and will not change after compiling (e.g. where there are no virtual calls). The dynamic code optimization mechanism 210 performs optimizations on those sections of the program code 122 that are dynamic and may change after the program code 122 has been compiled or may be effected by such changes. The dynamic code optimization mechanism 210 includes a virtual call optimization mechanism 214 and an effected code optimization mechanism 216.

The control mechanism 232 includes a virtual calls identification mechanism 228. The virtual calls identification mechanism 228 analyzes each method call in the program code 122 to assess if it is a virtual call. In this manner the control mechanism 232 can identify a method call as being either static or dynamic. On the basis of this information the control mechanism 232 may activate the dynamic code optimization mechanism 210 in addition to the static code optimization mechanism 212 if there are virtual calls present in the program code 122.

Although only two optimization mechanisms are shown in the code optimization mechanism 216 (i.e. the dynamic code optimization mechanism 210 and the static code optimization mechanism 212), this is for simplicity of illustration purposes. The static code optimization mechanism 212 may be composed of a plurality of mechanisms, each of which performs a different optimization on sections for the program code 122 that are static. Each of the plurality of mechanisms that comprise the static code optimization mechanism 212 may be performed serially on the program code 122. Thus, each optimization is performed one by one.

Similarly, the dynamic code optimization mechanism 210 is shown to have only two optimization mechanisms (i.e. the virtual call optimization mechanism 214 and the effected code optimization mechanism 216). Where more than one technique for optimizing virtual calls is used, there may be a separate virtual call optimization mechanism 213 for each technique. In the case of the effected code optimization mechanism 216, there is a separate mechanism for each type of optimization that is to be performed on a section of the program code 122 that is effected by the virtual call.

Each of the separate mechanisms for the static and dynamic code optimizations are able to detect sections of the program code 122 that can be optimized according to the specific technique implemented by the mechanism. This may be accomplished by identifying keywords, functions, etc. in the section.

The effected code optimization mechanism 216 may run serially after the virtual call optimization mechanism 214. Alternatively, each of the effected code optimization mechanisms 216 may have a corresponding static code optimization mechanism 212 where the static code optimization mechanism 212 performs the optimization when a virtual call does not affect the program code 122 and the effected code optimization mechanism 216 performs the same optimization when a virtual call does affect the code 122. In the latter case, the static code optimization mechanism 212 may detect the section of code 122 to be optimized but may also detect that a prior virtual call affects this section. The static code optimization mechanism 212 then activates the appropriate effected code optimization mechanism 216 to perform the optimization. Alternatively, the static code optimization mechanism 212 may set a flag to activate the effected code optimization mechanism 216 to perform optimization after the virtual call optimization mechanism 214 is done.

The virtual call optimization mechanism 214 searches the program code 122 to try to identify and optimize virtual calls (possibly having specific characteristics) according to known techniques. The virtual call optimization mechanism 214 includes a call graph construction mechanism 226 which builds a call graph for an identified virtual call based on the methods that can be reached from the method in the virtual call since these are the methods that may be effected by the dynamic character of the virtual call method. The virtual call optimization mechanism 214 may try to remove the virtual characteristic from the method call by assessing which object(s) will likely call the method based on the class hierarchy previously created. As a fail-safe, the virtual call optimization mechanism 214 may insert a section of code around the virtual call to enable the virtual call to be activated only when a certain criteria fails. This criteria is based on the assumption used to remove the virtual characteristic from the method call and enables the program to be properly executed if the assumption does not hold true.

The effected code optimization mechanism 216 performs optimizations on those sections of the program code 122 that are effected by a virtual call. The effected code optimization mechanism 216 includes an assumption optimization mechanism 234, an assumption maintenance mechanism 236, a check maintenance mechanism 220 and a check placement mechanism 218.

Each of the effected code optimization mechanisms 216 optimizes sections of the program code 122 that are not a virtual call but may be effected by a virtual call. The effected code optimization mechanism 216 may include a pre-determined list of characteristics of sections of program code 122 that are effected by virtual calls against which the received section can be compared. Alternatively, the effected code optimization mechanism 216 may consider any section of code that cannot be optimized by the static code optimization mechanism 212 due to a dynamic call to be an effected section of the program code 122, or any section that requires assumptions to be made about the state of the class hierarchy and the call graph.

The assumption optimization mechanism 234 makes assumptions about the state of the class hierarchy, the call graph and other indications of the state as appropriate (e.g. class hierarchy and call graph are assumed to be static), and optimizes the effected section of the program code 122.

The assumptions made by the assumption optimization mechanism 234 are communicated to the check placement mechanism 218. The check placement mechanism 218 assesses the assumptions made for the optimization and inserts an assumption check instruction prior to the effected section of the program code 122 that enables the original un-optimized section of the program code 122 to be used when the assumptions made are not valid. Thus, the program operates normally when the assumptions are false. The check maintenance mechanism 220 maintains information regarding the effects of the virtual call and the assumptions made by the assumption optimization mechanism 234.

The assumption maintenance mechanism 236 interacts with the execution environment 120 to establish a data structure for maintaining the current status of the assumption(s) during execution of the program code 122. The data structure may indicate, for example, if the class hierarchy has changed and if a call graph for a given virtual call has changed. Upon compiling and making the assumptions, the assumption maintenance mechanism 236 initializes the data structure to indicate that there are no changes.

A corresponding environment assumption maintenance mechanism (not shown) may be present in the execution environment 120 to monitor the assumption to determine when changes occur. When a new class is loaded the environment assumption maintenance mechanism updates the data structure to relay this information. At the same time the methods reachable from each virtual call are analyzed to determine if the call graph has changed and this information is also indicted in the data structure. The environment assumption maintenance mechanism also determines if the newly loaded class overrides any previously compiled methods, thus changing the call graph. Alternatively, the environment assumption maintenance mechanism may check to see if any classes with methods in the call graph have been extended or built upon by the newly incorporated class and, if this is the case, assume that the call graph has changed.

The check placement mechanism 218 includes a guard insertion mechanism 222 for inserting the assumption check into the program code 122. The guard insertion mechanism 222 may insert the assumption directly (e.g. by checking a variable that may be maintained to check the validity of the assumption) or through the used of a "no operation" command. The "no operation" command may be inserted before the effected section of the program code 122 and can be monitored by the check maintenance mechanism 220. The location of the insertion of the "no operation" command is passed to the check maintenance mechanism 220.

The check maintenance mechanism 220 keeps track of the assumptions made at each of the locations at which a "no operations" command (e.g. NOP machine instruction) was inserted. When the check maintenance mechanism 220 detects that the assumption made during optimization is no longer valid then a command to direct flow (e.g. GOTO command) of the program to the original section of the program code 122 replaces the "no operation" command. This technique is commonly known as code patching.

Figure 3A:
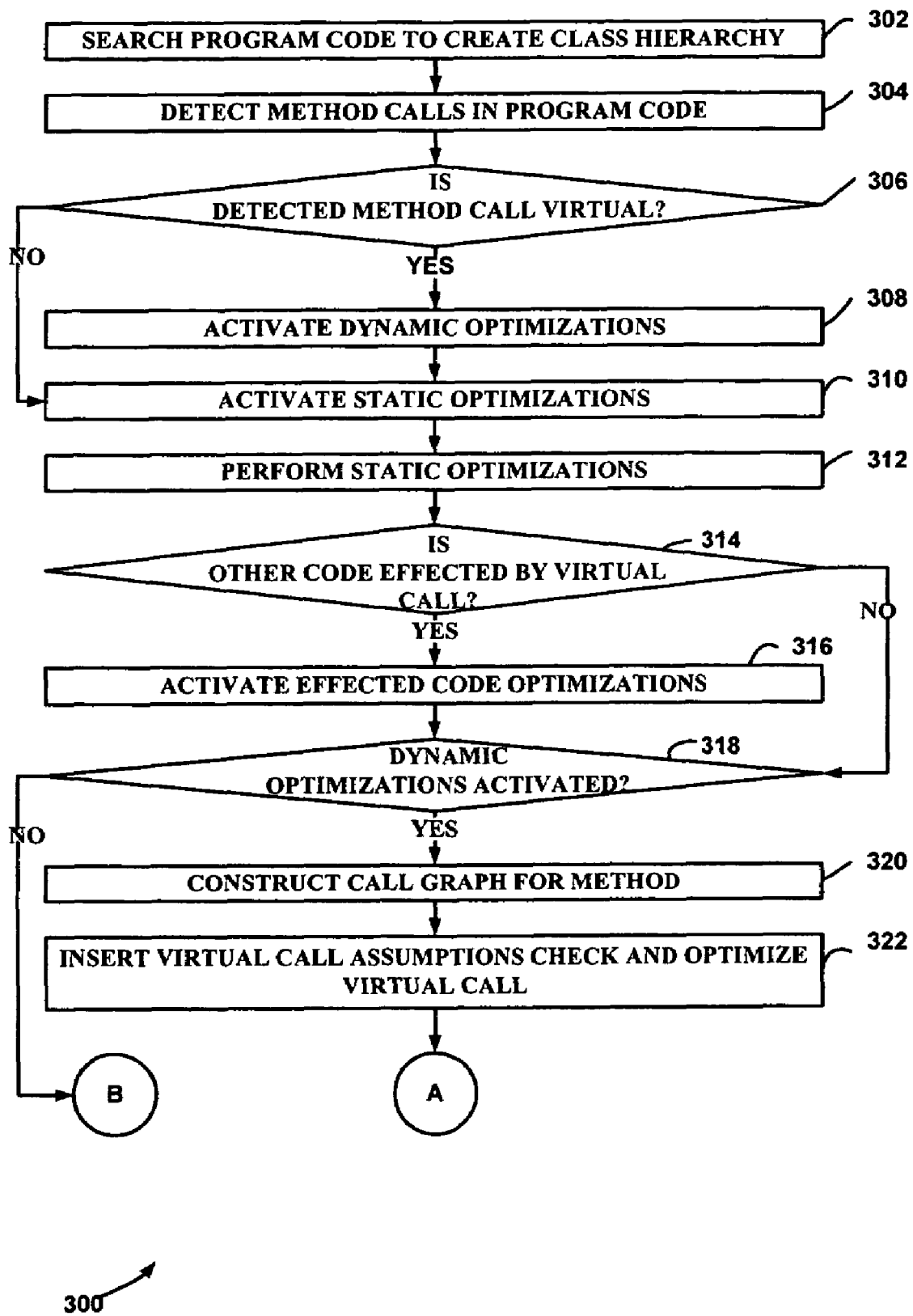
FIG. 3 is a flow diagram for an optimization method in the presence of virtual call according to an embodiment of the present invention.
Figure 3B:
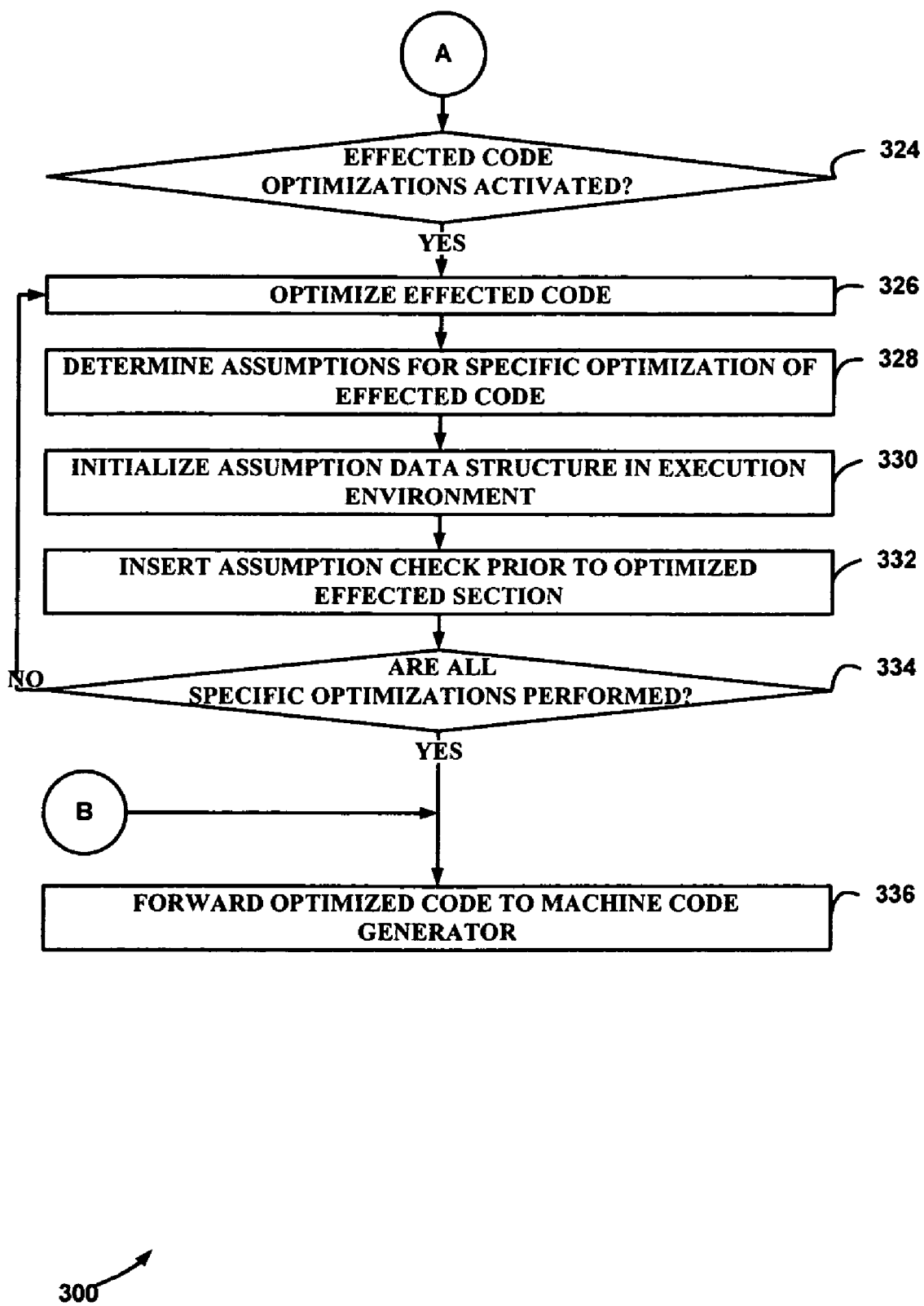

FIG. 3 is a flow diagram illustrating a method 300 for optimizing the program code 122 in a dynamic compilation environment where the class hierarchy and the call graph of the program code 122 are not static. The program code 122 is searched in step 302 to create the class hierarchy. Method calls in the program code 122 are detected in step 304 and virtual method calls are identified in step 306.

If a virtual call is detected in step 306 then the dynamic optimizations are activated in step 308 If no virtual calls are detected or after the dynamic optimizations have been activated, the static optimizations are activated in step 310. The static optimizations are then performed in step 312. If there was a section of program code 122 that is effected by a virtual call as determined during static optimization, as detected in step 314, then the effected code optimizations are activated in step 316. A pre-determined list of characteristics of sections of program code 122 that are effected by virtual calls may be included for comparison with the received section. Alternatively, any section of code that cannot be optimized by the static code optimization mechanism 212 due to a dynamic call to be an effected section of the program code 122, or any section that requires assumptions to be made about the state of the class hierarchy and the call graph may be considered to be effected by the virtual call.

After the effected code optimizations are activated in step 316 or if no sections of the program code 122 are effected by a virtual call as determined in step 314 then it is determine din step 318 if the dynamic optimizations have been activated. If the dynamic optimizations have been activated, a call graph is constructed for the method in step 320. After the call graph is constructed for the virtually called method, the virtual call is optimized in step 322 and a check is inserted to ensure that the virtual call is performed if assumptions made in optimizing the virtual call are false.

After the virtual call has been optimized it is determined in step 324 if the effected code optimizations have been activated. If the effected code optimizations have been activated then the effected code is specifically optimized in step 326 by making assumptions about the results of the virtual call. That is, a particular optimization is performed on the program code 122 that is effected by a virtual call. The assumptions taken to optimize the program code 122 are determined in step 328. A data structure in the execution environment 120 that keeps track of the assumptions is initialized in step 330 to reflect the current state of the assumptions. A check of the validity of the assumptions, as indicated by the data structure, is added to the program code 122 in step 332.

The check of the validity of the assumptions enables the original un-optimized section of the program code 122 to be used when the assumptions made are not valid. Thus, the program operates normally when the assumptions are false. The assumption check may be placed in the program code 122 directly (e.g. by checking a variable that may be maintained to check the validity of the assumption) or through the used of a "no operation" command. The "no operation" command may be inserted before the effected section of the program code 122. When it is detected that the assumption made during optimization is no longer valid then a command to direct flow (e.g. GOTO command) of the program to the original section of the program code 122 replaces the "no operation" command.

After the specific optimization is complete (steps 326 to 332) then it is determined in step 334 if there are other optimizations to effected program code 122 to be performed. If there are other optimizations to be performed to effected code 122 then steps 326 to 334 are repeated until such other optimizations are complete. After the specific optimizations are finished, or if there were no effected sections or virtual calls in the program code 122 to optimize, then the optimized program code is provided to the machine code generator 208 in step 336.

There are various types of optimizations that may be effected by virtual calls. A brief description of various exemplary optimizations and the use of the check performed on effected code is described below. The following examples take advantage of functionality found in the Java language; however, this should not be taken to limit the present invention to the use of such language.

EXAMPLE 1

Loop Invariants

The example below illustrates a case where the call to the method value in the method CalculateTotal is virtual since the method defined in either class A or class B can be used depending on the type of the array element α that is the receiver of the call. As a result of this, the expression this .f (referring to the class variable f of the class receiving the call) cannot be taken out of the loop for optimization (which would result in fewer of these calls being made thus reducing time and resources for execution of the method) since it is not known if the virtual call will modify this value.

```
class A{
    int f = 5;
    int g = 10;
    int value ( ) {return this.f;}
    int CalculateTotal (A[ ] a) {
        int total = 0;
        for (int I=0; i<100; I++) {
            total = total +a[i].value( );
            Total = total/this.f;}
    }
}
class B extends A {
    int value( ) {return this.g;}
return total; }
```

In the optimized example of the method CalculateTotal the virtual call is changed using techniques known in the art and an assumption check is added to the expression this.f to allow it to be taken out of the loop.

```
int CalculateTotal (A[ ] a) {
    int total = 0;
    t = this.f;
    for (int i=0; i,100; i++) {
        if (invoked method == method value defined in class A)
            temp = a[i].f;
        else
            temp = a[i].value( );
        total = total + temp;
        if (assumption for method value == false)
            t = this.f;
        total = total/t;
    }
    return total; }
```

EXAMPLE 2

Global Common Sub-expressions

The example below illustrates the case where a sub-expression calculation common to multiple lines cannot be assumed to have the same result. In this case a virtual call between the two common calculations means that a single calculation cannot be used since the virtual call could cause a numerical change in one of the variables used in the calculations.

$t1=o.f+5$;

o.m( );

$t2=o.f+5$;

The optimized example below shows the virtual call remaining but the common sub-expression has been moved before the virtual call and is only performed once. The assumption check before the setting of the second variable using the common expression ensures that the second variable is set correctly if the assumption is false.

temp=$o.f+5$;

t1=temp;

o.m( );

if (assumption for method m==false)

temp=$o.f+5$;

t2=temp;

EXAMPLE 3

Global Constant Propagation

The example below illustrates the case where a variable value is set and then the variable is called again after a virtual call. The variable is not directly changed in the code but may be changed by the virtual call and thus the exact value of a second variable relying on the previously set variable cannot be exactly determined.

o.f=5;

o.m( );

$t1=o.f+5$;

The optimized example below shows the variable t1 being set to a constant 10 when the assumption that method m does not effect the variable o.f is correct.

o.f=5;

o.m( );

if (assumption for method m==false)

$t1=o.f+5$;

else t1=10;

EXAMPLE 4

Global Type Propagation

The example below illustrates the case where there are multiple virtual calls that rely on the results of each other. In this example, the virtual call m has two possible target methods at compile time (from class A or class B).

```
class A {                          class B extend A {
    A m( ) {return new A( ); }        A m( ) {return new A( ); }
    int m1( ) {return 5;}             Int m1( ) {return 10:}
}                                  }
A a=p;
A t1 = a.m( );
int t2 = t1.m1( );
```

In the optimized example below the method m in class A and class B have been examined and it has been noted that the t1 will always be of type A. Given this deduction, the virtual character of the call to m1 can be removed.

A a=p;

A t1=a.m( );

if (assumption for method m==false)

int t2=t1.m1( );

else int t2=5;

EXAMPLE 5

De-synchronization

The example below illustrates a case where an object is twice locked and unlocked to obtain two different variables in the object.
lock object
read object.f1;
unlock object
(Virtual call which does not modify object.f2)
lock object
read object.f2;
unlock object In the optimized example below accessing f1 and f2 can be performed within the same lock procedure since the virtual call between accessing f1 and f2 does not modify f2.

```
lock object
read object.f1;
read object.f2;
unlock object
if (call graph of virtual call changed)
    lock object
    read object.f2;
    unlock object
```

EXAMPLE 6

De-synchronization Using Escape Analysis

The example below illustrates a case where a newly created object t1 has not yet escaped to another thread and the only escape point for the object t1 is the virtual call m. Thus, synchronization is not required to access t1 to prevent other threads from simultaneously accessing t1. However, the virtual call m provides the possibility for t1 to escape to another thread.

```
A t1=new A( );
this.m(t1);
lock(t1)
unlock(t1)
```

In the optimized example below, the synchronization (lock/unlock) of t1 only needs to be performed under certain circumstances, that is, where m has created a thread on which t1 escapes.

```
A t1=new A( );
this.m(t1);
if (assumption for method m==false)
    lock(t1)
if (assumption for method m==false)
    unlock (t1)
```

In the present invention program code that is effected by a virtual call can be optimized. A virtual call may be any method call in object-oriented program code where the class of the object calling the method is not known thus creating uncertainty as to what method will actually be called during execution of the program code. Further, class may be dynamically incorporated into the program code producing unpredictability in the classes incorporated in the program code. As a result of the virtual call, subsequent sections of the program code may have an unpredictable state. That is, the class hierarchy, call graph, numerical values of variables, etc., may not be predictable during compiling of the program code due to virtual calls and dynamic class incorporation. If assumptions about the state of an effected section are made then the section can be optimized if a check of the assumptions is placed around the original un-optimized section to allow execution thereof should the assumptions be false.

It should be apparent to one skilled in the art that the present invention can be used in conjunction with any object oriented programming language in which classes may be dynamically loaded during execution of program code and in which the execution environment supports storing and maintaining assumption information as classes are loaded.

It is apparent to one skilled in the art that numerous modifications and departures from the specific embodiments described herein may be made without departing from the spirit and scope of the invention.

The invention claimed is:

1. In a dynamic compiling environment, a method of optimizing computer program code having a virtual call that produces unpredictable effects, said method comprising:
    identifying a section of the computer program code whose associated state is unpredictable as a result of the virtual call;
    optimizing the section based on a set of assumptions about the associated state; and
    creating a test in the section for validity of the set of assumptions to activate the optimized section if the set of assumptions is valid, wherein creating the test in the section comprises placing a test section into the computer program code prior to the optimized section to determine if the set of assumptions is valid.

2. The method according to claim 1, wherein the step of optimizing includes: inserting the optimized section into the computer program code prior to the un-optimized section and the method further comprising:
    activating the optimized section if the set of assumptions is valid; and
    activating the un-optimized section if the set of assumptions is invalid.

3. In an execution environment having a dynamic compiler and an operating environment for execution of computer program code, a method of optimizing the computer program code having a virtual call that produces unpredictable effects, said method comprising:
    identifying a section of the computer program code whose associated state is unpredictable as a result of the virtual call;
    optimizing the section based on a set of assumptions about the associated state;
    creating a test in the section for validity of the set of assumptions to activate the optimized section if the set of assumptions is valid, wherein creating the test in the section comprises placing a test section into the computer program code prior to the optimized section to determine if the set of assumptions is valid; and
    monitoring the associated state of the section during execution of the computer program code to maintain a watch on the validity of the set of assumptions.

4. The method according to claim 3, wherein the step of optimizing includes: inserting the optimized section into the computer program code prior to the un-optimized section and the method further comprising:
    activating the optimized section if the set of assumptions is valid; and activating the un-optimized section if the set of assumptions is invalid.

5. The method according to claim 3, wherein the step of creating a test includes:
    creating a monitoring data structure to maintain the status of the associated state and the validity of the set of assumptions; and
    initializing the monitoring data structure to indicate that the set of assumptions is valid.

6. The method according to claim 5, wherein the step of monitoring the associated state includes:
    detecting a change in the associated state; and
    updating the monitoring data structure according to the detected change in the associated state.

7. The method according to claim 3, wherein the operating environment is a virtual machine.

8. A system for optimizing a computer program code having a virtual call that produces unpredictable effects in an execution environment having a dynamic compiler and an operating environment, said system comprising:
    a plurality of optimization mechanisms each performing a different type of optimization, each mechanism comprising:

an identification mechanism for identifying a section of the computer program code according to the type optimization performed by the optimization mechanism, the section having an associated state that is unpredictable as a result of the virtual call;

a section optimization mechanism for optimizing the section based on a set of assumptions about the associated state;

a test mechanism for creating a test in the section for validity of the set of assumptions to activate the optimized section if the set of assumptions are valid, wherein the test mechanism for creating the test comprises the test mechanism being operable to place a test section into the computer program code prior to the optimized section to determine if the set of assumptions is valid;

a data storage containing an indication of the associated state for the section and the result of the associated state on the validity of the set of assumptions; and a monitoring mechanism for monitoring the associated state and updating the indication of the associated state in the data storage to maintain a check of the validity of the assumptions during execution of the computer program code.

9. The system according to claim 8, wherein the test mechanism includes:
a data structure creation mechanism for creating and initializing a monitoring data structure in the data storage, the monitoring data structure containing the indication of the associated state and the result of the associated state on the validity of the set of assumptions.

10. The system according to claim 8, wherein the monitoring mechanism includes:
a change detection mechanism for detecting a change in the associate state; and
an update mechanism for updating the indication of the associated state and the result of the associate state on the validity of the set of assumptions according to the detected change in the associated state.

11. The system according to claim 8, wherein the operating environment is a virtual machine.

12. A computer readable medium having stored thereon computer-executable instructions for optimizing computer program code having a virtual call that produces unpredictable effects in a dynamic compiling environment, said computer-executable instructions comprising:
identifying a section of the computer program code whose associated state is unpredictable as a result of the virtual call;
optimizing the section based on a set of assumptions about the associated state; and
creating a test in the section for validity of the set of assumptions to activate the optimized section if the set of assumptions is valid, wherein creating the test in the section comprises placing a test section into the computer program code prior to the optimized section to determine if the set of assumptions is valid.

13. The computer-executable instructions according to claim 12, wherein the step of optimizing includes: inserting the optimized section into the computer program code prior to the un-optimized section and the method further comprising:
activating the optimized section if the set of assumptions is valid; and
activating the un-optimized section if the set of assumptions is invalid.

14. A computer readable medium having stored thereon computer-executable instructions for optimizing the computer program code having a virtual call that produces unpredictable effects in an execution environment having a dynamic compiler and an operating environment for execution of computer program code, said computer-executable instructions comprising:
identifying a section of the computer program code whose associated state is unpredictable as a result of the virtual call;
optimizing the section based on a set of assumptions about the associated state;
creating a test in the section for validity of the set of assumptions to activate the optimized section if the set of assumptions is valid, wherein creating the test in the section comprises placing the test section into the computer program code prior to the optimized section to determine if the set of assumptions is valid;
and monitoring the associated state of the section during execution of the computer program code to maintain a check of the validity of the set of assumptions.

15. The computer-executable instructions according to claim 14, wherein the step of optimizing includes: inserting the optimized section into the computer program code prior to the un-optimized section and the method further comprising
activating the optimized section if the set of assumptions is valid; and
activating the un-optimized section if the set of assumptions is invalid.

16. The computer-executable instructions according to claim 14, wherein the step of creating a test includes:
creating a monitoring data structure to maintain the status of the associated state and the validity of the set of assumptions; and
initializing the monitoring data structure to indicate that the set of assumptions is valid.

17. The computer-executable instructions according to claim 16, wherein the step of monitoring the associated state includes:
detecting a change in the associated state; and
updating the monitoring data structure according to the detected change in the associated state.

18. The computer-executable instructions according to claim 14, wherein the operating environment is a virtual machine.

* * * * *

UNITED STATES PATENT AND TRADEMARK OFFICE
CERTIFICATE OF CORRECTION

PATENT NO. : 7,661,098 B2
APPLICATION NO. : 10/845548
DATED : February 9, 2010
INVENTOR(S) : Sheikh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1652 days.

Signed and Sealed this

Twenty-eighth Day of December, 2010

David J. Kappos
*Director of the United States Patent and Trademark Office*